United States Patent [19]
Farr et al.

[11] Patent Number: 5,722,594
[45] Date of Patent: Mar. 3, 1998

[54] CONVERTIBLE CHILD STROLLER/ PACKAGE CARRIER

[76] Inventors: Sandra L. Farr; David E. Farr, both of R.D. #2, Box 2168, Orwigsburg, Pa. 17961

[21] Appl. No.: 514,554

[22] Filed: Aug. 14, 1995

[51] Int. Cl.[6] ............................. B62B 7/10; B62B 7/12
[52] U.S. Cl. .................. 280/643; 280/648; 280/658; 280/644; 280/DIG. 3
[58] Field of Search ..................... 248/98; 280/293, 280/304.1, 304.5, 642, 643, 644, 647, 648, 42, 657, 658, 47.38, DIG. 3, 30

[56] References Cited

U.S. PATENT DOCUMENTS

| | | | |
|---|---|---|---|
| 1,554,034 | 9/1925 | Richie | 248/98 |
| 4,157,839 | 6/1979 | Lahti et al. | 280/642 |
| 4,759,559 | 7/1988 | Moulton | 280/40 |
| 5,197,753 | 3/1993 | Liu | 280/642 |
| 5,286,134 | 2/1994 | Huang | 403/389 |
| 5,288,098 | 2/1994 | Shamie | 280/642 |
| 5,364,112 | 11/1994 | Jackson | 280/30 |
| 5,536,027 | 7/1996 | Gollub | 280/30 |

*Primary Examiner*—Brian L. Johnson
*Assistant Examiner*—Avraham H. Lerner
*Attorney, Agent, or Firm*—Antonelli, Terry, Stout & Kraus, LLP.

[57] ABSTRACT

A convertible child stroller/package carrier having a wheeled frame, a child seat which can be removably fastened to the frame to provide a child stroller, and a package holder which likewise can be removably fastened to the wheeled frame to provide a package carrier. The wheeled frame ordinarily has four legs, with a wheel assembly on each. Two additional legs with wheel assemblies can be attached on the rear of the wheeled frame to provide additional stability when carrying heavy packages. The wheeled frame is preferably hinged to permit folding of the child stroller/package carrier for ease of transporting, either by carrying by hand or by placement in an automobile or other vehicle. The package holder is preferably a weather resistant bag or a mesh bag and is preferably provided with a drawstring for closing of the bag when the package carrier is removed from the wheeled frame.

14 Claims, 3 Drawing Sheets

5,722,594

CONVERTIBLE CHILD STROLLER/ PACKAGE CARRIER

BACKGROUND OF THE INVENTION

The present invention pertains to a convertible child stroller/package carrier. More particularly, the present invention pertains to a wheeled carrier adapted for holding a child seat, to permit transporting of a child seated on the seat, and further adapted for holding of a package holder, to permit transporting of packages held within the package holder.

Parents of infants and young children frequently desire a wheeled child carrier or stroller on which the child can be seated to permit the parents to push the stroller and the child when the parents are walking. Such child strollers are widely used by parents during various activities. Among such activities is shopping. Reaching a store or shopping center often requires travelling by automobile. This necessitates the transporting of the child stroller in the automobile. Consequently, collapsible child strollers are popular, including umbrella style strollers such as available from Nelson Juvenile Products Co. of Dothan, Ala.

When shopping, the parents frequently accumulate a significant number of packages which require transporting, either back to the automobile or directly to the home or other location. Since properly controlling the child stroller requires the use of two hands, it is difficult, if not impossible, for one parent to both control the child stroller and to carry the packages. Although there are wheeled package carriers available, they generally are not collapsible for transporting in an automobile. In addition, it is not possible for one parent to both control a child stroller and control a wheeled package carrier. Further, such wheeled package carriers generally do not protect the packages from the weather.

Once a child is able to walk, the child can, and often prefers to, walk for some distance even when a child stroller is available. Thus, it is possible to use the child stroller for the carrying of packages, with the child walking and holding on either to the child stroller or to the parent. However, the child stroller, being designed for a child to sit on it, has a maximum weight carrying capacity of about 40 pounds and a limited ability to hold bulky packages. Consequently, the child stroller has limited ability to carry large, heavy packages.

In addition, often people without children desire a package carrier when shopping. Many such people, for example, grandparents or other relatives of a child, find it desirable to have available a child stroller even though they do not use it every day, since they desire to have it available for when a grandchild or other young relative or friend visits.

Just as with the child stroller, such a package carrier is preferably collapsible to permit ready transporting of it in an automobile.

SUMMARY OF THE INVENTION

The present invention is a convertible child stroller/package carrier which satisfies these needs. In accordance with the present invention, a wheeled frame mechanism is provided with both a child seat member, which can be removably fastened on the wheeled frame mechanism to provide a wheeled child stroller, and a package holding member, which likewise can be removably fastened on the wheeled frame mechanism to provide a wheeled package carrier. Thus, alternatively, a child can be transported on the child stroller or packages can be transported on the package carrier. Thus, the present invention provides a convertible child stroller/package carrier which can be used alternatively as a child stroller or as a package carrier.

In one preferred embodiment, the child stroller/package carrier includes a wheeled frame mechanism having four leg members, with a wheel attached to the lower end of each leg member, and further includes a pair of detachable leg members with a wheel on each so that the convertible child stroller/package carrier can have four wheels when utilized as a child stroller and six wheels when utilized as a package carrier, to provide extra stability for large or heavy packages.

Preferably, a removable top member is also provided. Such a top member can comprise a canopy for placement over the child seat when the present invention is utilized as a child stroller. Likewise, the top member can comprise a cover for the package holder when the present invention is utilized as a package carrier.

In a preferred embodiment, the child stroller/package carrier is capable of being folded to a carrying position, which also permits ready transporting of the child stroller/package carrier in an automobile. Preferably, also, the child stroller/package carrier is provided with a pair of umbrella-type handles permitting convenient carrying of the child stroller/package carrier, particularly when the child stroller/package carrier is folded in the carrying position.

The package holder preferably takes the form of a flexible bag, and even more preferably a weather resistant bag such as a canvas bag or a vinyl bag. Alternatively, a mesh bag might be utilized. The flexible bag might include a sleeve to cooperate with a pair of rods on the wheeled frame for supporting of the bag. Alternatively, the flexible bag can be provided with hook and loop fasteners cooperating with such rods for fastening of the bag on the rods. The bag can be provided with a draw string for closing of the bag when the bag is removed from the wheeled frame member.

BRIEF DESCRIPTION OF THE DRAWINGS

These and other aspects and advantages of the present invention are more apparent from the following detailed description and claims, particularly when considered in conjunction with the accompanying drawings in which like parts bear like reference numerals. In the drawings:

DETAILED DESCRIPTION OF A PREFERRED EMBODIMENT

Figure 1:
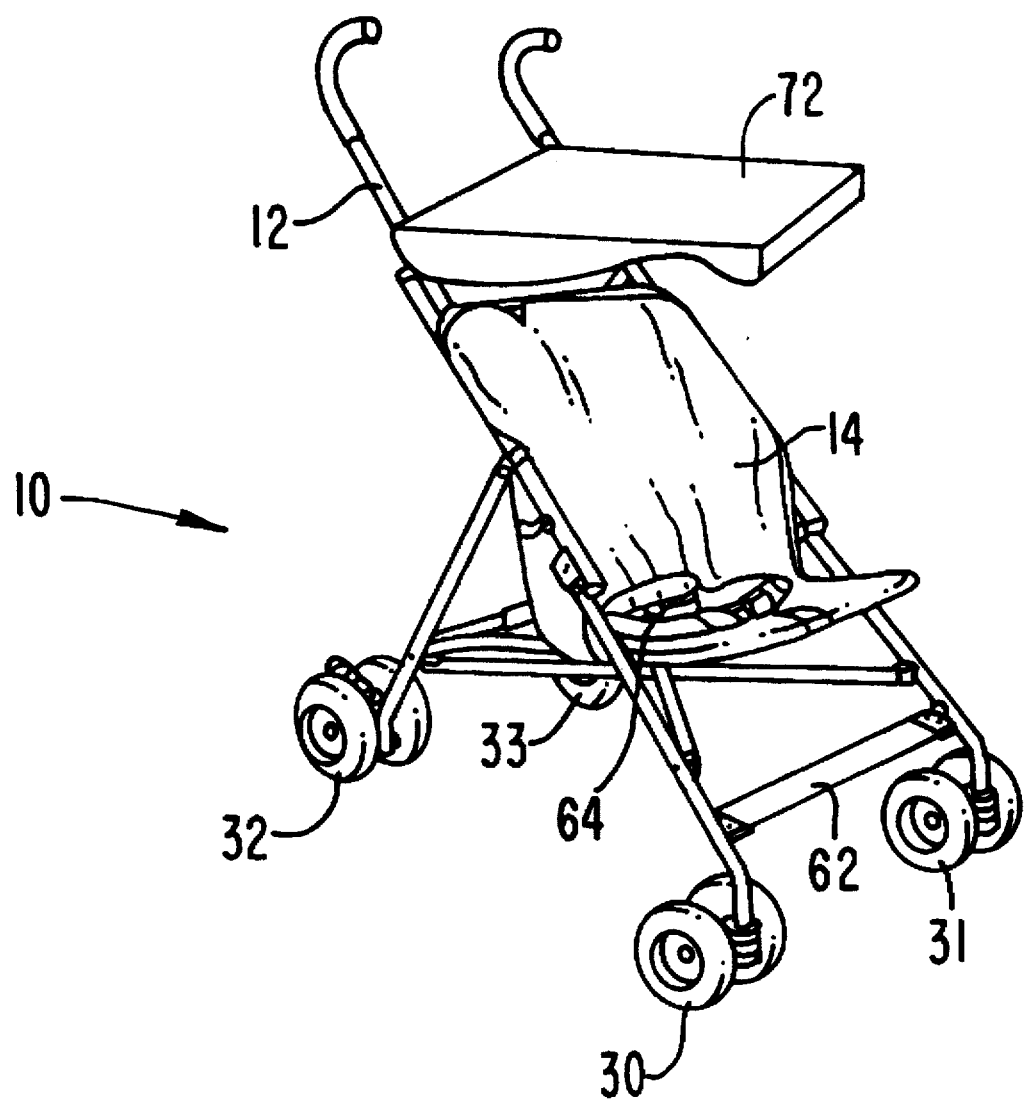
FIG. 1 is a perspective view of a convertible child stroller/package carrier in accordance with the present invention in its child stroller configuration.
Figure 2:
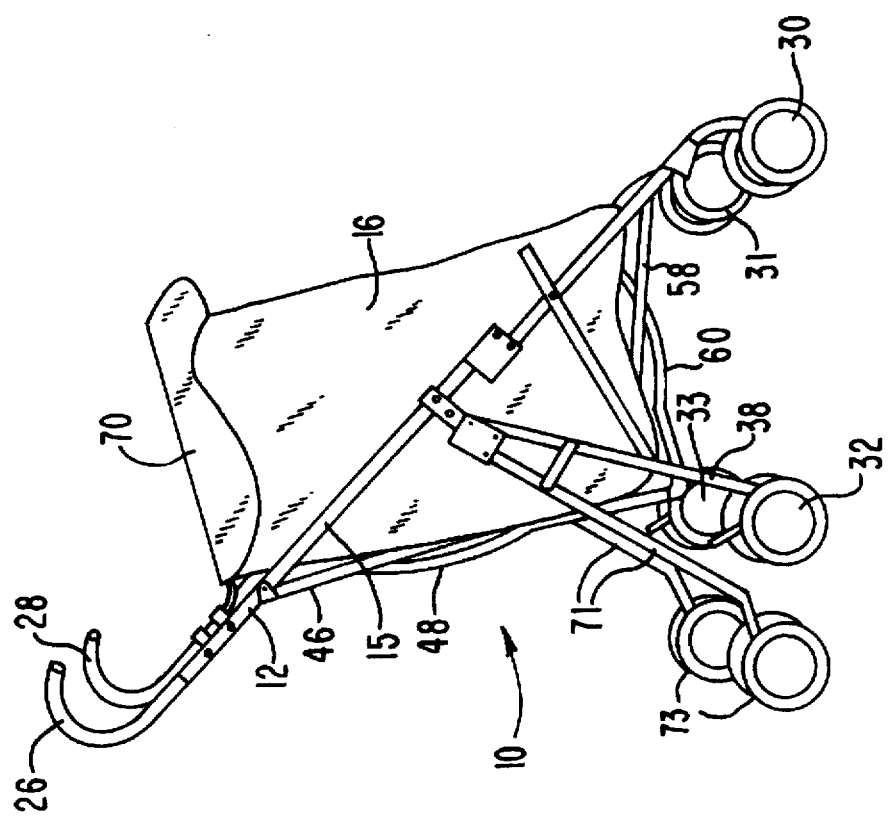
FIG. 2 is a side, partially perspective, view of a convertible child stroller/package carrier in accordance with the present invention in its package carrier configuration.

FIG. 1 depicts a convertible child stroller/package carrier 10 in accordance with the present invention in its child stroller configuration. In such configuration, the child stroller includes a wheeled frame mechanism 12 and a child seat member 14 which is removably fastened on wheeled frame mechanism 12. FIG. 2 depicts the convertible child stroller/package carrier 10 of the present invention in its package carrier configuration. In this configuration, the package carrier includes the wheeled frame mechanism 12 and a package holding member 16 which is similarly removably fastened on the wheeled frame mechanism 12.

Figure 3:
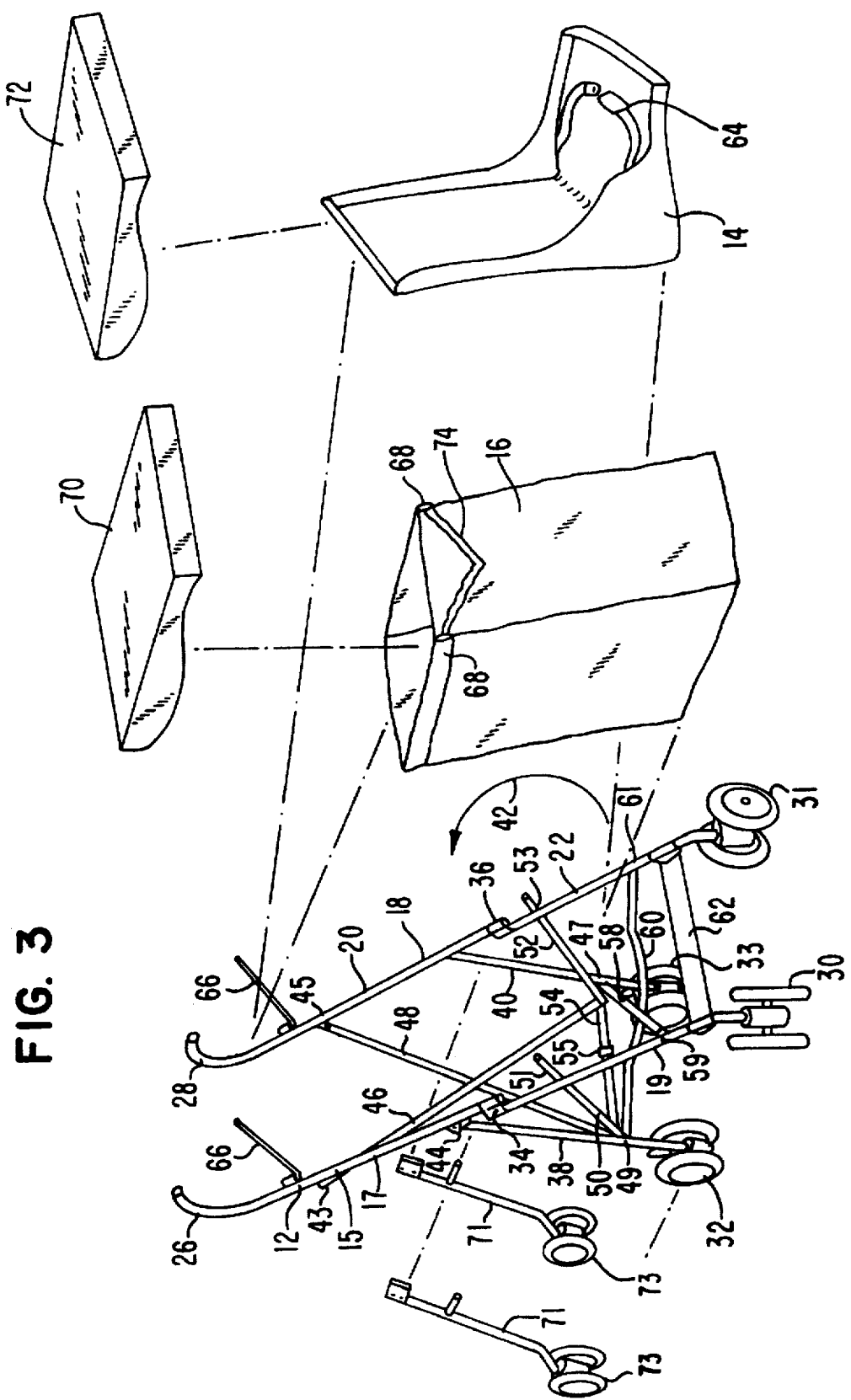
FIG. 3 is an exploded view of the components of the convertible child stroller/package carrier in accordance with the present invention.

As can be seen from FIG. 3, the wheeled frame mechanism 12 includes a first of side member 15 which is made up of an upper portion 17 and a lower portion 19, and a second side member 18, which is made up of an upper portion 20 and a lower portion 22. Preferably, each upper portion 17, 20 has at its upper end an umbrella-style handle 26, 28. Support rods 66 extend from upper portions 17, 20, below handles 26, 28 to support canopy 72 in the child stroller configuration of FIG. 1.

Upper portion 17 and lower portion 19 of first side member 15 are hingedly connected by hinge 34, while upper portion 20 and lower portion 22 of second side member 18 are hingedly connected by hinge 36. As a consequence, lower portions 19, 22 may be pivoted in the direction of arrow 42 to positions adjacent upper portions 17, 20, respectively, for ease of carrying the child stroller/package carrier by means of umbrella handles 26, 28. Also, in this folded configuration, the child stroller/package carrier can readily be fitted into an automobile for ease of transportation.

First support member 38 is hingedly connected by hinge 44 to upper portion 17 of first side member 15 at a point slightly above hinge 34. Similarly, second support member 40 is connected by a hinge (not shown) to upper portion 20 of second side member 18 at a point slightly above hinge 36. A pair of swivel wheel assemblies 30, 31 is provided at the lower ends of lower portions 19, 22 of side members 15, 18, while a pair of non-swivel wheel assemblies 32, 33 is provided at the lower ends of support members 38, 40. For improved stability, preferably each wheel assembly 30–33 includes two wheels, as depicted in the drawings.

A first rear brace member 46 extends from a point 43 on the upper area of upper portion 17 to a point 47 near the lower end of the support member 40 on the opposite side of the wheeled frame mechanism 12. Similarly, a second rear brace member 48 extends from a point 45 on the upper area of upper portion 20 to a point 49 near the lower end of the opposite support member 38. As can be seen from FIG. 2, rear brace member 48 includes a bowed portion to permit it to pass behind rear brace member 46.

A first side brace member 50 extends from point 49 on support 38 to a point 51 on lower portion 19 of first side member 15. A second side brace member 52 extends from point 47 on support 40 to a point 53 on lower portion 22 of second side member 18. A horizontal brace member 54 extends between points 49 and 47 on support members 38 and 40. A first bottom brace member 58 extends between point 47 and a point 59 near the lower end of lower portion 19 of first side member 15. A second bottom brace member 60 extends between point 49 and a point 61 near the lower end of lower portion 22 of second side member 18. Second bottom brace member 60 includes a bowed portion to permit it to pass beneath first bottom brace member 58. The brace members 46, 48, 50, 52, 54, 58, 60 are pivotally attached to members 17, 19, 20, 22, 38, and 40 as needed, while horizontal brace member includes a hinge or pivot 55, so as to permit pivoting of lower portions 19 and 22 and upper portions 17 and 20 about hinges 34 and 36. A foot rest 62 extends between the lower end of lower portion 19 and the lower end of lower portion 22, above wheel assemblies 30, 32.

As depicted in FIG. 1, to use child stroller/package carrier 10 as a child stroller, seat 14 is attached to frame 12 by any suitable and secure means, such as screws, snaps or spring biased pins. In this configuration, a child, for example up to a weight of about 40 lbs., can be seated on seat member 14 and transported from place to place by pushing of the child stroller. A seat belt 64 can be provided on seat 14 to retain the child in the seat.

As seen in FIG. 2, to use the child stroller/package carrier 10 as a package carrier, package holder 16 is attached to the frame 12. For this purpose, support rods 66 pass through sleeves 68 on the upper end of package holder member 16, as illustrated in FIG. 2. The package holder 16 is preferably an elongated bag type member which fits snugly between side members 15 and 18 and rests on bottom braces 58 and 60. In this package carrier configuration, foot rest 62 need not be utilized, and so could be removed if desired, although if properly positioned relative to bottom braces 58, 60, the foot rest can provide additional stability for package holder 16.

Figure 4:
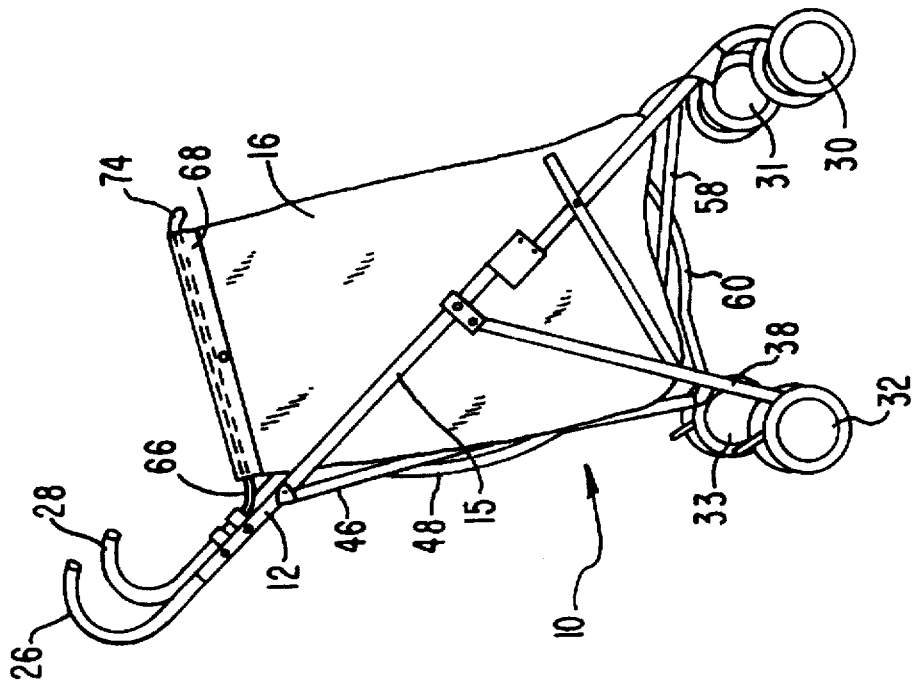
FIG. 4 is a side, partially perspective, view of a convertible child stroller/package carrier in accordance with the present invention in its package carrier configuration and including additional optional components.

If desired, a removable cover 70 can be provided for package holder 16, as illustrated in FIG. 4. Similarly, a canopy 72, shown in FIG. 3, can be supported over child seat 14 by support rods 66. Alternatively, a single cover member 70 might be configured to serve both as a cover for package holder 16 and also a canopy over seat 14.

To permit the transporting of heavier packages in the package holder 16, an additional set of legs 71, 71 with wheel assemblies 73, 73 can be attached behind legs 38 and 40, so that legs 38 and 40 are intermediate leg members, as illustrated in FIG. 4. This adds to the stability of the package carrier. Alternatively, if desired, legs 38 and 40 can be removed when legs 71, 71 are added.

As can be appreciated from FIGS. 1 and 2 of the drawings, the convertible child stroller/package carrier 10 of the present invention can conveniently be utilized as a child stroller of the type shown in FIG. 1 and then readily converted to a package carrier as depicted in FIG. 2. This simply involves removing the child seat 14 and canopy 72 from wheeled frame 12 and slipping the support rods 66 through sleeve 68 of package carrier 16, with cover 70 also supported on rods 66 if desired. Package carrier 16 is preferably provided with a drawstring 74 which also passes through sleeve 68 to permit gathering of the top of the package carrier when it is off of wheeled frame 12 so as to close package carrier 16. Thus, the convertible child stroller/package carrier can conveniently be used by parents with a small child on a shopping trip or can be utilized by adults wishing to carry packages, who also having available a child stroller for visiting children.

Although the present invention has been described with reference to preferred embodiments, various rearrangements and modifications can be made, and still the result would come within the scope of the invention.

We claim:

1. A convertible child stroller/package carrier, comprising in combination:

a wheeled frame mechanism;

a pair of rod members adapted for connection adjacent the top of said wheeled frame mechanism, to extend therefrom while being removable therefrom;

a child seat member adapted to be removably fastened on said wheeled frame mechanism beneath said pair of rod members, permitting a child to be seated on said child seat member, to provide a wheeled child stroller for transporting the child on said child stroller by pushing thereof;

a flexible bag member having a pair of sleeves at substantially the top thereof for sliding of said pair of rods thereinto, to removably suspend said flexible bag member on said wheeled frame mechanism, so as to permit packages to be placed in said flexible bag member, to provide a wheeled package carrier for transporting the packages on said package carrier by pushing thereof; and a top member removably positionable on said wheeled frame mechanism over one of said child seat member and said flexible bag member;

whereby, alternatively, a child stroller or a package carrier is provided.

2. A convertible child stroller/package carrier as claimed in claim 1, wherein said wheeled frame mechanism comprises:

a support frame portion including a pair of front leg members, a pair of rear leg members and a plurality of brace members joining said front and rear leg members to form a frame; and a pair of front wheels attached to said front leg members, and a pair of rear wheels attached to said rear leg members.

3. A convertible child stroller/package carrier as claimed in claim 2, wherein:

said support frame portion further includes a pair of intermediate leg members;

said intermediate leg members or said rear leg members are detachable from said frame members; and said wheeled frame mechanism further comprises a pair of intermediate wheels attached to said intermediate leg members, whereby alternatively the child stroller/package carrier can be operated in a four-wheeled mode or in a six-wheeled mode.

4. A convertible child stroller/package carrier as claimed in claim 2, wherein said wheeled frame mechanism further comprises a plurality of hinge members permitting folding of said frame mechanism to bring said child stroller/package carrier to a folded carrying position.

5. A convertible child stroller/package carrier as claimed in claim 1, wherein said top member comprises a canopy having a pair of sleeves therein for sliding of said pair of rods thereinto, to removably suspend said canopy over said child seat member.

6. A convertible child stroller/package carrier as claimed in claim 1, wherein said top member comprises a cover over said flexible bag member.

7. A convertible child stroller/package carrier as claimed in claim 1, wherein said wheeled frame mechanism includes a plurality of hinge members permitting said child stroller/package carrier to be folded to a carrying position.

8. A convertible child stroller/package carrier as claimed in claim 7, wherein said wheeled frame mechanism further includes a pair of umbrella handle members permitting carrying of said child stroller/package carrier.

9. A convertible child stroller/package carrier as claimed in claim 1, wherein said flexible bag member is weather resistant.

10. A convertible child stroller/package carrier as claimed in claim 9, wherein said flexible bag member is a canvas bag.

11. A convertible child stroller/package carrier as claimed in claim 9, wherein said flexible bag member is a vinyl bag.

12. A convertible child stroller/package carrier as claimed in claim 1, wherein said flexible bag member is a mesh bag.

13. A convertible child stroller/package carrier as claimed in claim 1, wherein said flexible bag member includes a drawstring for closing said flexible bag member when said flexible bag member is removed from said wheeled frame mechanism.

14. A convertible child stroller/package carrier as claimed in claim 1, wherein said wheeled frame mechanism includes a pair of umbrella handle members permitting carrying of said child stroller/package carrier.

* * * * *